US006844647B2

(12) United States Patent
Horber (10) Patent No.: US 6,844,647 B2
(45) Date of Patent: Jan. 18, 2005

(54) PERMANENT MAGNET MOTOR HAVING FLUX DENSITY CHARACTERISTICS THAT ARE INTERNALLY VARIABLE

(75) Inventor: Ralph W. Horber, Marshfield, MA (US)

(73) Assignee: Seiberco Incorporated, Braintree, MA (US)

( * ) Notice: Subject to any disclaimer, the term of this patent is extended or adjusted under 35 U.S.C. 154(b) by 0 days.

(21) Appl. No.: 10/229,298

(22) Filed: Aug. 27, 2002

(65) Prior Publication Data

US 2004/0041485 A1 Mar. 4, 2004

(51) Int. Cl.[7] .......................... H02K 21/12; H02K 1/27; H02K 19/38; H02K 16/00
(52) U.S. Cl. .................. 310/156.43; 310/112; 310/266; 310/12; 310/114
(58) Field of Search ................... 310/156.43, 156.38, 310/156.01, 12–15, 266, 209, 191, 112, 114, 156.07, 156.37, 156.44, 156.45, 156.28, 156.29, 156.48–156.5, 156, 156.12–156.13

(56) References Cited

U.S. PATENT DOCUMENTS

| | | | | |
|---|---|---|---|---|
| 4,920,295 A | * | 4/1990 | Holden et al. | 310/209 |
| 5,598,044 A | * | 1/1997 | Satomi et al. | 310/12 |
| 5,723,928 A | * | 3/1998 | Imai et al. | 310/114 |
| 5,811,905 A | | 9/1998 | Tang | 310/179 |
| 5,821,710 A | | 10/1998 | Masuzawa et al. | 318/254 |
| 5,994,809 A | * | 11/1999 | Ackermann | 310/103 |
| 6,008,614 A | | 12/1999 | Imai | 318/100 |
| 6,057,622 A | | 5/2000 | Hsu | 310/191 |
| 6,194,802 B1 | | 2/2001 | Rao | 310/91 |
| 6,215,206 B1 | * | 4/2001 | Chitayat | 310/12 |
| 6,246,147 B1 | * | 6/2001 | Hockemeyer et al. | 310/268 |
| 6,304,017 B1 | * | 10/2001 | Leupold | 310/115 |
| 6,304,052 B1 | | 10/2001 | O'Meara et al. | 318/700 |
| 6,320,488 B1 | * | 11/2001 | Leupold | 335/306 |
| 6,384,507 B1 | * | 5/2002 | Lee et al. | 310/211 |
| 6,555,941 B1 | * | 4/2003 | Zepp et al. | 310/191 |
| 2003/0090167 A1 | * | 5/2003 | Kajiura et al. | 310/156.36 |

FOREIGN PATENT DOCUMENTS

| | | | | |
|---|---|---|---|---|
| JP | 07067289 A | * | 3/1995 | H02K/7/12 |
| JP | 411136892 A | * | 5/1999 | H02K/1/27 |

OTHER PUBLICATIONS

"Incremental Motion Control Systems & Devices," Kuo and Lieu, Incremental Motion Control Systems Society, Jul. 24, 2001, pp. 123–127.
"Advanced BLDC Motor Drive. for Low Cost and High Performance Propulsion System in Electric and Hybrid Vehicle," Lee and Ehsani, Texas A & M University, Dept. of Electrical Engineering, IEEE, 2001, pp. 246–258.
"Control of Variable Winding Brushless Motor with the application in Electric Scooters," Tsai and Chau, Department of Mechanical Engineering, National Cheng Kung University of Technology, IEEE, 2001, pp. 922–925.
"A Fast Response Torque Control for Interior Permanent–Magnet Sychronous Motors in Extended Flux– Weakening. Operation Regime," Xu and Li, Department of Electrical Engineering, The Ohio State University, IEEE, 2001, pp. 33–36.

* cited by examiner

Primary Examiner—Thanh Lam
Assistant Examiner—J. Aguirrechea
(74) Attorney, Agent, or Firm—Ira S. Dorman (57) ABSTRACT

The permanent magnet brushless motor permits dynamic change of output characteristics by varying the positional relationships of rotor components, with respect to each other and with respect to the stator, to progressively effect field weakening with increasing speeds. The force required to impart the limited range of motion involved is transmitted to the rotor component by way of bearings and/or an actuation motor, and a helical guide path is used to great advantage for constraining such movement. The wide, dynamically adjustable motor output range of the motor effectively provides the equivalent of an efficient, continuously variable transmission. High torque at low speeds, and efficient, constant power output over a wide high speed range, uniquely adapt the motor for use as the prime mover for electric/hybrid vehicles.

22 Claims, 8 Drawing Sheets

PERMANENT MAGNET MOTOR HAVING FLUX DENSITY CHARACTERISTICS THAT ARE INTERNALLY VARIABLE

BACKGROUND OF THE INVENTION

Brushless permanent magnet motors are well known to have significantly higher torque-to-copper loss ratios then other kinds of motors, such as induction motors and switched reluctance motors. Copper loss values vary as a square function of total applied motor current, and are a primary factor in determining motor temperatures at standstill and at low speeds.

The torque output of a permanent magnet motor is substantively higher than that which can be produced by a non-permanent magnet motor of the same size, operating at the same temperature. This is so because the copper losses that are associated with the external electrical power used to provide the magnetic bias in a non-permanent magnet motor do not occur in permanent magnet motors. Moreover, currently available permanent magnet materials have very high magnetic energy densities, making it feasible to provide motors of comparable magnetic field strength, in which the electromotive driving force is generated using external electrical power and coils, only if active external cooling is applied.

It is to be appreciated that primary advantages afforded by permanent magnet motors at standstill and low speeds are generally regarded to become disadvantages at medium and high speeds. This is attributable to a number of factors, beyond those which are inherent in the high magnetic energy density of the magnets used. One such factor concerns the magnetic response characteristics of electrical steel. Iron losses vary as approximately square functions of frequency and flux, and at high speeds the flux densities that are magnetically induced in the stator (i.e., in the d-axis poles) cause iron losses to vary as a cubic function in the affected areas; thus, significantly increased amounts of power are consumed and commensurately elevated motor temperatures are generated. In addition, the rapid changes that occur in flux density generate correspondingly high values of back electromotive force (b-emf), thus further increasing the motor supply voltage demand, especially for the attainment of high speeds.

The inherent characteristics of permanent magnet motors are of course reflected in the kinds of applications for which they are typically employed. For example, permanent magnet motors dominate in positioning servo systems for industrial automation, in which applications the motor operates primarily to regulate about a selected position or to move from one position to the next; for such purposes high torque at standstill and lower speeds, and relatively small physical size, are primary criteria. Conversely, periods of high-speed operation in such applications are very brief, and the accompanying energy losses are accepted; moreover, high-voltage supplies are of course available, as needed, on a factory floor.

On the other hand, in mobile applications, such as for hybrid and electric vehicles (e.g., automobiles, buses, trucks, motorcycles, scooters, mopeds and, indeed, the so-called human transporters that have recently been introduced), the motor used must be capable of operating at high speeds and for long periods of time, and low efficiency at operating speeds is not acceptable. The difficulty of satisfying these criteria is increased by the need to use (now, and for the foreseeable future) low-voltage batteries, which severely limit speed range capability. As a result of such factors, induction motors and (to a lesser extent) switched reluctance motors are presently employed for vehicular applications, with the low torque that they produce during acceleration being either accepted or compensated for, typically (as to the latter) by overdriving of the motor; electrical power consumption and motor temperatures are therefore excessive, and battery life is significantly reduced.

Because of the recognized inherent benefits of permanent magnet motors, attempts have been made to overcome their disadvantageous high-speed characteristics. These efforts have usually employed so-called "field weakening" techniques, which are well known as a means for changing output characteristics of brush-type motors. The prior art indicates that analogous or equivalent measures have been attempted for brushless permanent magnet motors, using d-q control systems, tapped phase windings, and mechanical approaches.

More particularly, in accordance with U.S. Pat. Nos. 6,304,052, 6,057,622, and 6,008,614, d-q control is used in so-called "internal permanent magnet motors." They employ either steel bridges disposed across the magnets (inserted magnets) or between stator poles (magnetic short circuit bridges), or very thin permanent magnets. Proponents assert that the application of d-axis phase excitation increases high-speed performance of such motors; this could occur, however, only at the expense of significantly reduced low-speed torque capability.

Although the foregoing effect may be ameliorated by using narrower bridges, still low-speed torque values would typically be reduced to less then half of those which could be produced using standard surface magnet rotors, and the application of d-axis current would be expected to have limited range and effectiveness. This is so because b-emf is zero in the d-axis and highest in the q-axis, and the application of d-axis current could therefore affect b-emf only as a minor second order effect.

On the other hand, flux density is zero in the q-axis and has maximum values in the d-axis, which latter factor causes iron losses to approach a cubic function in the poles. The application of d-axis current (opposing the permanent magnet flux) reduces flux density in the d-axis poles, causing cubic (iron) losses to be replaced by square (copper) losses; the difference represents energy that becomes available for producing higher output speeds.

The stronger effect (resulting from the use of wide bridges) would be to even more greatly reduce low speed torque, causing it to approach the level of induction or synchronous reluctance motors but allowing the range of effect using d-current to be extended somewhat. The reduced flux density in the stator poles, caused by the use of wide bridges, would render the above-described cubic-to-square loss exchange less dominant, possibly making it only a second-order effect while, at the same time, possibly increasing the significance of the previously mentioned second-order effect. The influence component (d-axis current) has twice the electrical frequency of the permanent magnetic field, and even partial recovery of its generated torque is cumbersome, at best.

The mechanisms described above show the limitations of the d-q approach, the output range being restricted because of the loss-exchange nature of d-q control. For the same reason, motor temperatures at high speeds remain high, and the volume of active magnets, and low-speed torque values, are correspondingly low. Thus, the primary advantage and attractiveness of the permanent magnet motor (i.e., low speed torque) is significantly compromised.

In accordance with the technique disclosed in U.S. Pat. No. 5,811,905, the phase windings of the motor described are electrically tapped at intermediate points; the full windings are utilized at low speeds, and only portions of the windings (e.g., half, assuming mid-point taps) are employed at higher speeds. This technique produces an extended speed range by reducing the b-emf to a proportion of the value it would otherwise have had (e.g., to half). It does not however alter the magnet bias field, and iron losses remain very high in the d-axis poles, again resulting in reduced efficiency and high motor temperatures. In addition, difficulties are associated with the switching that is involved in alternating between full and partial energization of the phase windings.

Masuzawa et al. U.S. Pat. No. 5,821,710 and Rao U.S. Pat. No. 6,194,802 disclose motors in which centrifugally operated mechanical means is used for producing magnetic field weakening effects. More specifically, the Rao patent describes a motor in which magnets, supported in a carrier on the rotor, move radially outwardly in response to the centrifugal forces that are generated by rotor rotation. This technique reduces magnet-to-stator engagement and, in turn, decreases flux linkage and b-emf, ultimately leading to higher speeds; difficulties may arise however due to several factors: Not only are the radial forces acting upon the magnets a function of motion length, and hence highly nonlinear, but also, and perhaps more importantly, the magnitudes of those forces necessarily vary significantly with the speed of rotor rotation. There would also appear to be substantial differences in the radial forces that occur between d and q axis magnets, due in part to the current return path in the stator winding. Such force variations would be expected to induce oscillatory motion in the magnets during operation of the motor, making it difficult, if not impossible, to map magnet actuation into a useful speed range.

Masuzawa et al. employ a rotor that is comprised of two, axially adjacent bodies or sections, one being rigidly attached to the rotor shaft and the other being mounted for limited angular displacement relative to the first. When the rotor sections are normally aligned (i.e., not angularly displaced relative to one another) magnets of the same polarity on both sections are in mutual registration, and b-emf and torque are both maximized. Displacing the sections an angular distance corresponding to one magnet pitch (i.e., bringing N and S poles on the two sections into mutual registration) causes b-emf to be reduced to a very low value. Magnetic flux travels axially along the stator, but does not penetrate to a depth sufficient to enter the coils.

Measurements made using a prototype similar to the motor described in the Masuzawa et al. patent, but differing therefrom in that magnet volume and surface area were higher, produced the following results: Even at speeds as low as 2500 rpm, and flux densities common in modern conventional motors, difficulties were found to exist in the magnetic concept; i.e., as the rotor sections were angularly displaced b-emf decreased and measured iron losses increased (rather than decreasing). At speeds higher than 2500 rpm, moreover, iron losses became so dominant that efficient motor operation was not possible, evidently due to the generation of axial flux in the stator poles (axial flux polarity alternates according to electrical frequency, and flux density is high). In addition, due to the orientation of the planes of the stator laminations, large eddy current losses were induced in the stator pole tips, thus severely compromising high-speed efficiency. And finally (and although not tested), control difficulties would be anticipated in the use of such a motor; because the angularly shiftable rotor section is not constrained, interaction between the two rotor sections would be expected to transmit unanticipated and unpredictable torques to the motor load.

SUMMARY OF THE INVENTION

Accordingly, it is the broad object of the present invention to provide a permanent magnet motor that is capable of operating with a high degree of efficiency, and with substantially constant power output, over a wide and extended range of speeds.

It is a more specific object of the invention to provide such a motor which is especially adapted for use as the prime mover in vehicles of various kinds.

Additional objects of the invention are to provide a method for the control of operation of such motors so as to enable extension of the practical speed range capability thereof, and to also afford increased efficiency and enhanced power output characteristics.

It has now been found that certain of the foregoing and related objects of the invention are attained by the provision of a brushless permanent magnet motor comprised of a stator of magnetic material having a multiplicity of electrically energizable stator pole elements at locations spaced circumferentially thereabout, and a coaxial rotor assembly having a circumferential array of permanent magnets effectively disposed on an outer surface thereof and in a closely proximate, magnetically interactive, facing relationship to the stator pole elements. The rotor assembly comprises a cylindrical shell component, and a cylindrical inner component (which may comprise the rotor core component or a magnetic ring component interposed between the core and shell components) disposed concentrically within the shell component; outer and inner surfaces of the inner component and shell component, respectively, are disposed in magnetically close proximity to one another. The shell component and the inner component are displaceable relative to one another in the axial direction, in the rotational direction, or in both directions.

The shell component has an array of first magnetic elements extending circumferentially thereabout, and the inner component has an array of second magnetic elements, comprising permanent magnets, extending circumferentially about its outer surface; the "first" magnetic elements may also comprise permanent magnets, or they may comprise areas of relatively high permeability between which are interposed (in a circumferential sense) areas of relatively low permeability. The "first" and "second" magnetic elements are dimensioned, configured, and arranged to cooperatively generate relatively strong magnetic fields in a first relative position of the inner and shell components, and thereby to produce maximal values of flux density in the magnetic interaction between the stator pole elements and the permanent magnets, and to generate relatively weak magnetic fields in a second relative position of the components, to thereby produce substantially reduced values of flux density in such magnetic interaction. The polarities of the permanent magnets on the rotor assembly will normally alternate in the array, and the motor will usually additionally include means for effecting the required relative displacement between the first and second positions (although such shifting might also be effected manually), which means will normally and most desirably be operative independently of rotation of the rotor assembly and will usually comprise a servomotor, most desirably a linear servomotor.

In preferred embodiments the shell and inner components of the rotor assembly will be relatively displaceable in both the axial direction and also the rotational directions. Means utilized in the motor for constraining such displacement will advantageously comprise a guide member having structure which defines a path that includes a portion extending generally helically relative to the axis of the rotor assembly, and a follower member for cooperating with the guide member and including a follower element for movement along the path-defining structure, with one or the other of the guide member and the follower member being operatively connected to each of the rotor assembly components. The guide member structure will desirably also include a generally rectilinear axial portion leading to the helical portion, such that the "first" relative position of the shell and core components is produced with the follower element adjacent the terminus of the helical path portion, remote from the rectilinear portion. In certain embodiments the magnetic elements will desirably (or necessarily, when such elements constitute areas of relatively high permeability) extend at least substantially entirely through the radial thickness of the shell component of the rotor, and at least the "first" magnetic elements of the shell component may alternate with non-magnetic areas in the array thereof.

Certain of the objects of the invention are attained by the provision of a method wherein the motor described is operated from standstill with the rotor components substantially in the "first" relative position, and wherein the rotor components are displaced, relative to one another, toward the "second" relative position with increasing rotor speed. Generally, the extent of displacement will correspond directly to the increase of rotor speed.

A related development, of common inventorship herewith, provides a brushless permanent magnet motor comprised of a stator of magnetic material having a multiplicity of electrically energizable pole elements at locations spaced circumferentially thereabout, and a coaxial rotor having a circumferential array of permanent magnets disposed (generally, on an outer surface thereof) in a closely proximate, magnetically interactive, facing relationship to the stator pole elements. The rotor is mounted for axial displacement, relative to the stator, between a first position in which the stator pole elements and the permanent magnets bodies are disposed for maximal effective mutual registration, for producing maximal values of flux density in the magnetic interaction therebetween, and a second position in which the stator pole elements and the permanent magnets are disposed for substantially reduced effective mutual registration, for producing substantially reduced values of flux density in such magnetic interaction. Here again, the motor will usually include means for effecting the required relative displacement between the first and second positions, as described, the polarities of the magnetic bodies on the rotor will normally alternate in the array thereof, and the motor enables an analogous method to be carried out.

DETAILED DESCRIPTION OF THE ILLUSTRATED EMBODIMENTS

Figure 1:
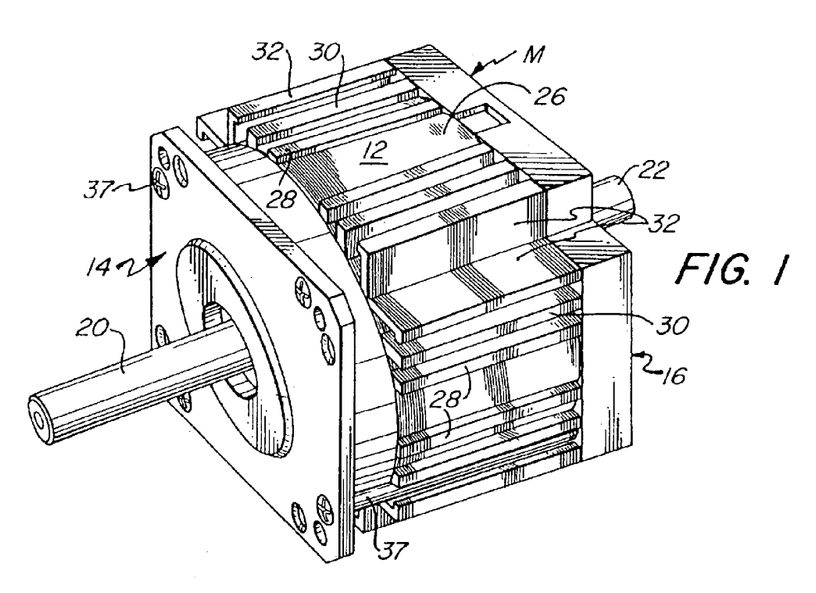
FIG. 1 is a perspective view of a motor embodying the prior art, as described and claimed in, for example, Horber, et al. U.S. Pat. No. 5,329,195.
Figure 2:
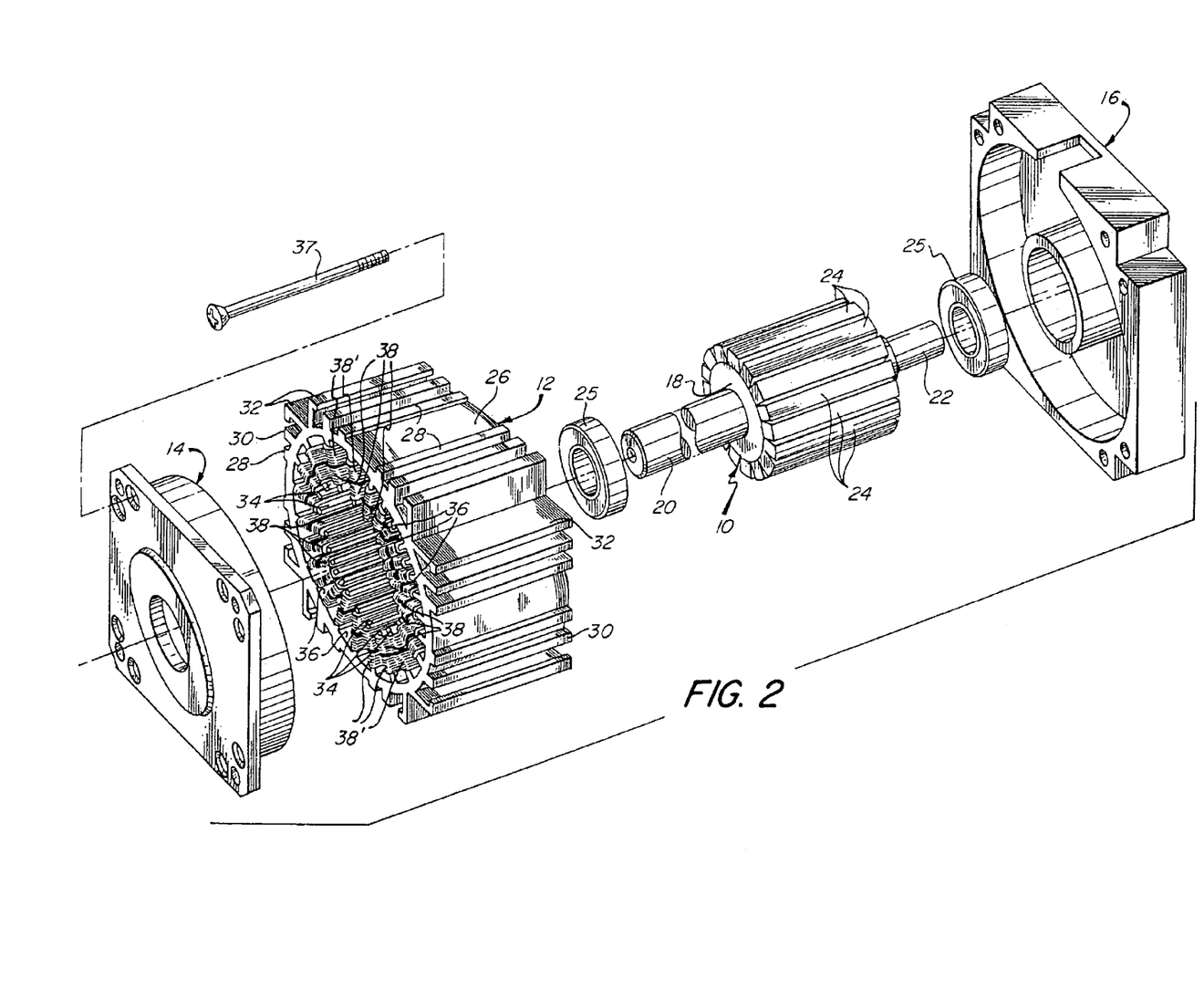
FIG. 2 is an exploded perspective view of the motor of FIG. 1.

Turning initially to FIGS. 1 and 2 of the appended drawings, therein illustrated is a prior art brushless DC motor, generally designated by the letter "M" It consists of a permanent magnet rotor, generally designated by the numeral 10, a stator generally designated by the numeral 12, and front and rear end caps generally designated, respectively, by the numerals 14 and 16. The rotor consists of a cylindrical core 18 with opposite axial shaft portions 20, 22, and an array of high-energy permanent magnets 24 secured (such as by adhesive bonding) on the surface thereof and extending longitudinally (axially) therealong; the magnets are disposed with their polarities alternating in the array, and will advantageously be made of a samarium/cobalt alloy. Suitable bearings 25 are mounted within the end caps 14, 16 and serve to receive the opposite end portions 20, 22 of the shaft for rotatably supporting the rotor 10, in a conventional fashion.

The stator 12 is comprised of numerous laminae of punched or stamped magnetic material (steel) fabrication. As can be seen, the laminae consist of an annular body element 26, with 24 pole elements 34 extending radially inwardly therefrom at equidistantly spaced locations about its inner circumference; each laminae is of course of one-piece, integrally formed construction. The pole elements 34 are of rectangular configuration and, as a result, define slots 36 therebetween which are relatively wide at the base and taper in a radially inward direction. As will be appreciated, the stacked laminae 24 cooperatively provide the poles 34 of the stator (for convenience, the parts of the stator and the elements of the laminae from which they are formed are given the same numbers); the poles are of substantially rectangular configuration in both their axial and also their transverse planes, and thus they have a single thickness dimension and a single axial length dimension, at all points taken along their radial length. Four long bolts 37 extend through apertures in the front end cap 14 and are secured within tapped openings in the rear cap 16, to hold the parts in assembly, and longitudinally extending ribs 28, 30, 32 serve as integral radiator for dissipation of heat.

Each pole 34 of the stator 12 has two coils 38, 38' disposed adjacently thereupon and insulated therefrom with paper or a synthetic resinous material, in a conventional manner. The coils 38, 38' are wound and interconnected in an appropriate fashion (to perform torque and sensing functions, respectively), as will be apparent to those skilled in the art and as is, in any event, exemplified by the arrangement described in the above—identified Horber et al. patent; a typical system in which such a motor may be employed is also described in the patent.

Figure 3:
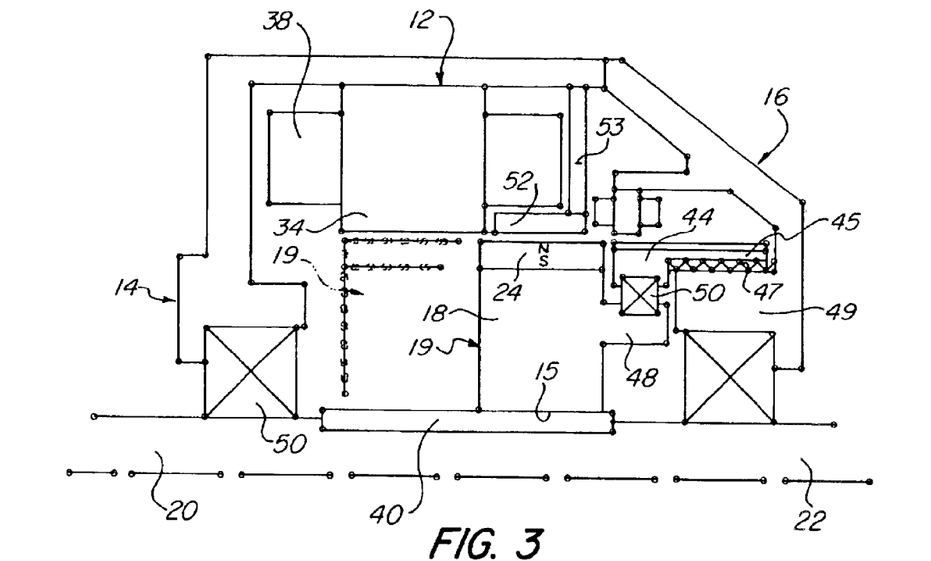
FIG. 3 is a diagrammatic illustration of the related motor referred to hereinabove, having an axially displaceable rotor body.
Figure 4:
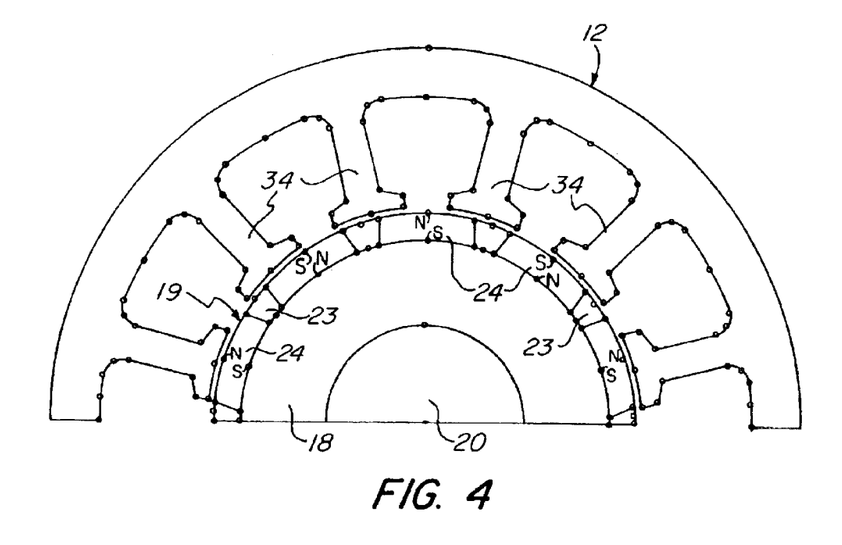
FIG. 4 is a diagrammatic, fragmentary sectional view of the motor of FIG. 3.

Turning now in detail to FIGS. 3 and 4 of the drawings, therein illustrated diagrammatically is a relatively simple form of motor, related to those which embody the present invention and which may employ the conventional rotor and stator of the motor illustrated in FIGS. 1 and 2, modified however in a unique and fundamental way. Thus, while being fixed on the shaft against relative rotation, the rotor body is movable axially thereon (conceivably, the rotor body might instead be rigidly attached to a shaft that is itself movable axially within the stator). At standstill and low speeds the rotor body is fully inserted into the stator, and thus produces maximum torque. With increasing speeds, however, the rotor body is progressively withdrawn from the stator in the axial direction, normally to an extent that is proportional to motor velocity; this causes b-emf and iron losses to decrease, and thereby extends the speed range of the motor and enables it to produce a substantially constant level of power throughout a broad speed range.

More particularly, and as is depicted in FIGS. 3 and 4 of the drawings, the rotor body, generally designated by the numeral 19, is slidably mounted for axial displacement on the shaft 20, 22 (similar components and elements may be given common numbers throughout this description). A key or spline 40 is rigidly affixed to the shaft 20, 22, and the bore through the rotor body 18 is axially slotted at 15 for slidable engagement on the spline 40. An axially extending collar element 48 on the rotor body 18 engages a bearing 50, which is also attached to the rotor 44 of an actuating servomotor, the stator of which is depicted at 42 and is attached to the rear cover 16 of the motor. The rotor 44 of the actuating servomotor has an internally threaded collar portion 45, which engages the threaded outside surface 47 of hub structure 49 of the rear cover 16.

As will be appreciated, rotation of the rotor 44 of the servomotor will be translated into linear motion by the cooperating threads on the collar portion and hub structure 45, 49, which motion is in turn transmitted to the rotor body 18 through the interengaging bearing 50. In this manner the axial position of the rotor body 18 can be varied relative to the energizable poles 34 on the stator 12. The level of magnetic interaction that occurs between the permanent magnets 21 (which are separated by non-magnetic areas 23) on the rotor body 18 and the energized stator poles 34 (the windings being omitted however from FIG. 4) is thereby increased or decreased so as to achieve, by virtue of the resultant magnetic field strength variation, maximum efficiency from the motor throughout a wide velocity range. It will be appreciated that maximum speed will be attained with the rotor body in the fully withdrawn position, indicated by the full-line representation in FIG. 3, and that maximum torque (for operation from standstill, and a low speeds) will be produced with the rotor body in the filly inserted position, depicted in phantom line.

FIG. 3 also depicts a magnetic shunt ring 52 (advantageously of laminated construction, and suitable for use in the motors embodying the invention), mounted on a supporting piece 53 attached to the motor housing. The shunt ring 52 serves to increase permeability adjacent the stator poles, and thereby to reduce the reaction force that is required for insertion of the rotor (against the repulsive force of the permanent magnets), such reduction being great practical importance (as will be discussed more fully below) and constituting a very significant feature of the invention. Although the presence of such a shunt ring 52 may reduce the high-speed efficiency of the motor somewhat, any such reduction could be eliminated by designing the shunt so as to rotate with the rotor (with however correspondingly increased complexity and motor length).

Figure 5A:
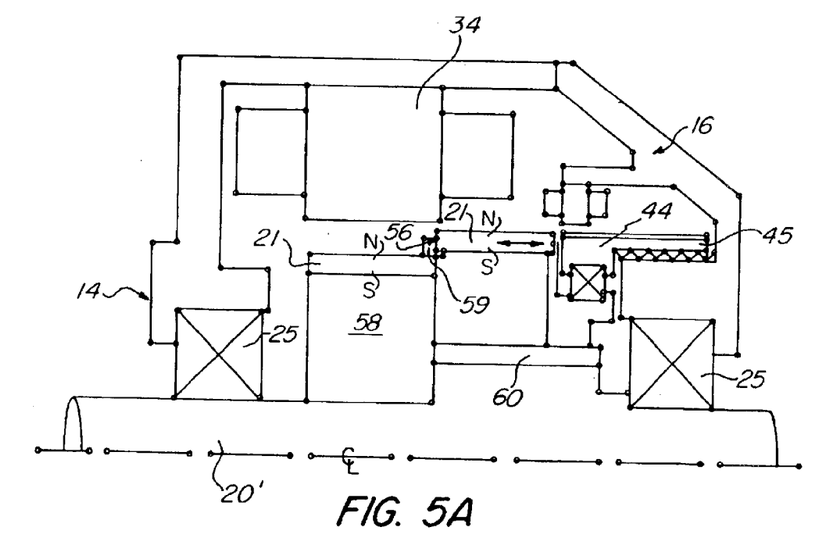
FIG. 5A is a diagrammatic illustration of a motor embodying the present invention, having a rotor assembly consisting of relatively displaceable, concentric shell and core components, embodying the present invention.
Figure 5B:
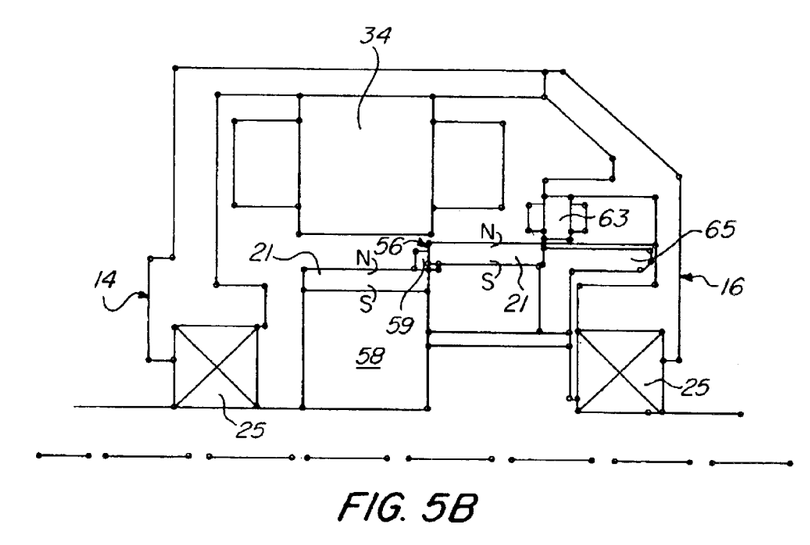
FIG. 5B is a similar, fragmentary view showing a linear actuator employed in that motor.
Figure 6:
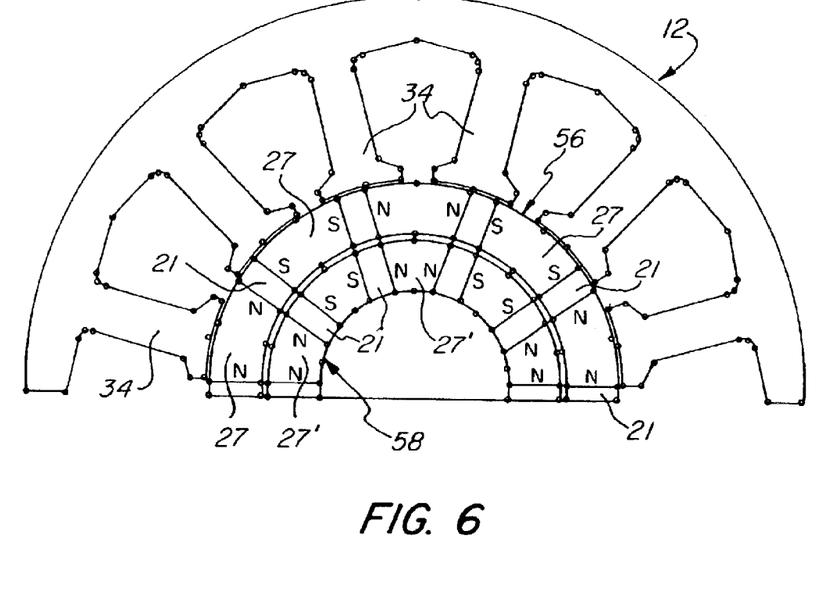
FIG. 6 is a diagrammatic, fragmentary sectional view of the motor of FIG. 5.

FIGS. 5 through 9 of the drawings show embodiments of the invention wherein the rotor body of the motor constitutes an assembly comprised of a shell component, generally designated by the numeral 56, and a core component generally designated by the numeral 58. As is best seen in FIG. 6, the shell component 56 is cylindrical and is comprised of an array of ten radially and axially extending permanent magnets 25 (the figure comprises a semicircular cross-sectional view, and therefore actually depicts only four magnets 25 and two half magnets), interposed between adjacent bodies 27 of magnetic material (desirably in the form of laterally stacked laminae), the magnets 25 being so oriented as to impart the indicated north/south (N/S) magnetic polarity to the bodies 27. The core component 58 of the rotor assembly is of similar construction, with the magnet bodies 27' of course being dimensioned to conform to its smaller diameter.

As can be seen in FIG. 5A, the core component 58 of the rotor assembly rotates in a fixed position on the shaft 20'. The shell component 56 is formed with structure for constraining it to slidable movement along a helical path, by following the key 60 provided on the shaft 20', and a sleeve bearing 59 engages the shell component 56 for effecting its displacement along that path during rotation of the rotor assembly; the fully withdrawn position is depicted in the figure.

It will be appreciated that displacement of the shell component 56 relative to the core component 58 effects field weakening in two ways: by shifting the magnetic bodies 27, 27' on the shell and core components 56 and 58, respectively, from fully aligned positions of their of common magnetic poles (strongest field) to partially or fully misaligned positions (weakened fields); and by withdrawing the magnetic array on the shell 56 outwardly of the stator so as to progressively decrease the density of the magnetic flux that can flow between the stator poles 34 and the rotor assembly. FIG. 5B illustrates the use of a linear actuator (servomotor), comprised of a stator 63 and rotor 65, in place of the servomotor depicted in FIG. 5A.

Figure 7:
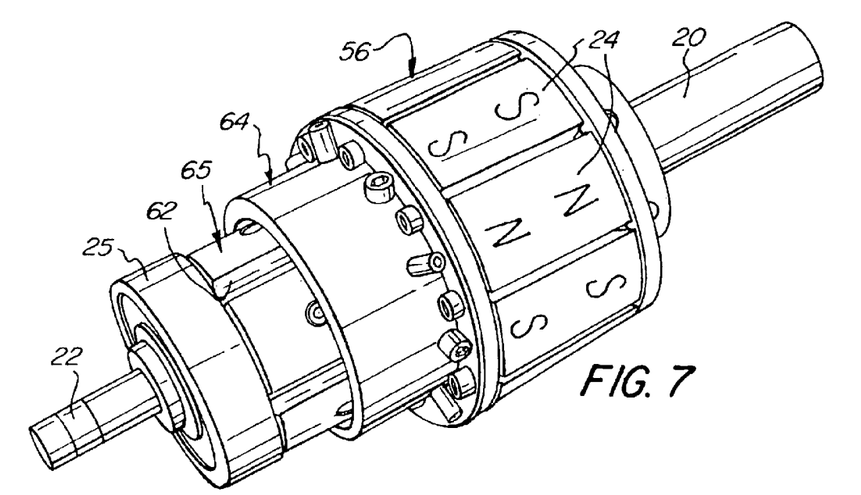
FIG. 7 is a perspective view of a rotor assembly consisting of relatively displaceable, concentric shell and core components, showing the core component in a position fully withdrawn from to the shell component.
Figure 8:
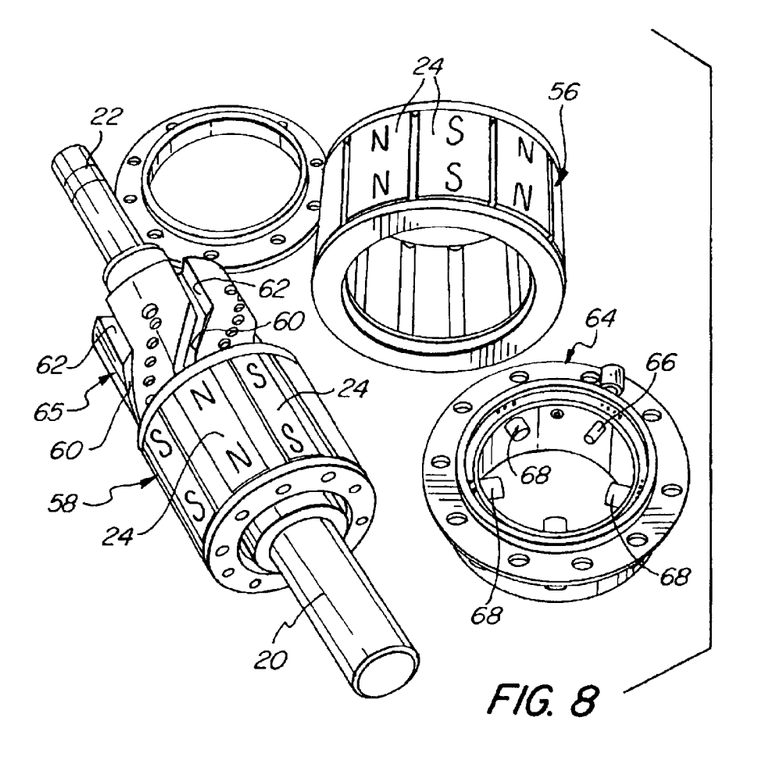
FIG. 8 is a perspective view showing parts of the rotor assembly of FIG. 7, disassembled from one another.

FIGS. 7 and 8 show a prototype rotor assembly embodying the invention and incorporating the features of the rotor described in FIGS. 5 and 6. In addition, however, in this form of rotor assembly the path by which relative movement of the shell and core components is constrained includes a rectilinear section in addition to the helical section previously described.

As can be seen, the core 58 carries an array of permanent magnets 24, and has an attached guide member, generally designated by the numeral 65, which defines five slots or channels, each having a helical section 60 and a rectilinear section 62, the latter being aligned with the axis of the shaft 20, 22. A collar, generally designated by the numeral 64, is attached to the shell component 56 and carries five pins 66

(only one of which is visible), which project radially inwardly of the passage through the collar and rotatably mount bronze follower elements 68; (only four of which are shown in place); in assembly of the shell and core components, the follower elements 68 engage, with low friction, within the channels formed in the guide member 65 by the sections 60, 62.

Axial force upon the shell component 56, to effect withdrawal from the stator, will initially cause relative angular displacement of the components (as well as relative axial movement) due to the constraint of the helical path sections 60 upon the follower elements 68. With continued withdrawal, the shell component will undergo simple axial movement relative to both the core and also the stator, by virtue of the constraints of the rectilinear sections 62. By presenting inclined surfaces to resolve the magnetic forces (produced by magnets 24) that strongly urge axial movement of the shell component, the structure described reduces considerably (and indeed, can neutralize) the reaction force necessary to effect displacement thereof.

Figure 9:
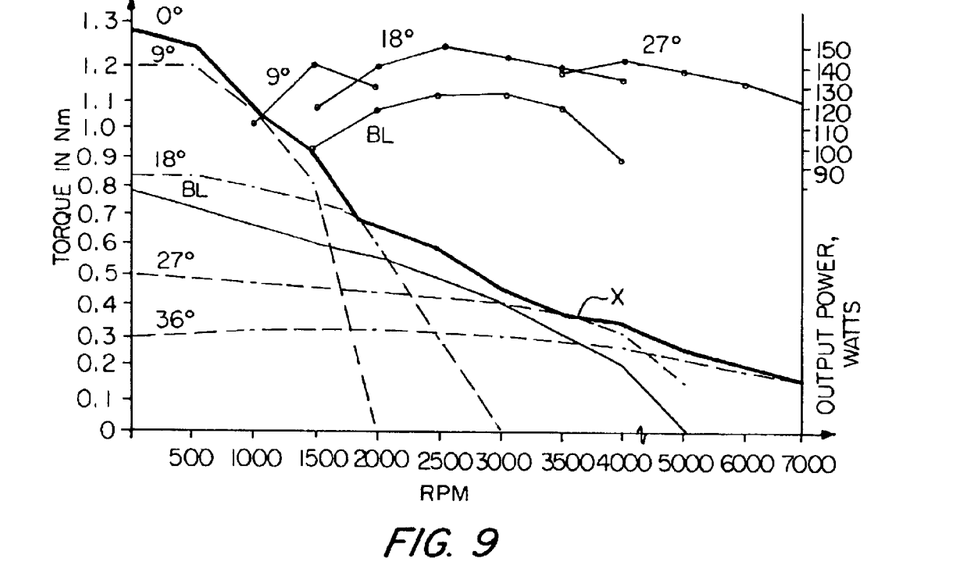
FIG. 9 is a graph of curves presenting torque and power data obtained with a motor comprised of a shell/core rotor assembly, and also presenting comparative data obtained with an analogous conventional motor.

Operating characteristics of the motor described are graphically illustrated in FIG. 9 of the drawings, which shows actual measured torque values produced through a range of speeds and with various angular relationships established between the shell and core components of the rotor (it being appreciated however that adjustment is continuous throughout the full range of angular variation provided). The notation "BL" designates the curve for a conventional permanent magnet, brushless DC motor of the kind illustrated in FIGS. 1 and 2 of the drawings. The performance envelope (i.e., the heavy-line curve "X") was developed using a prototype motor embodying the invention and comprised of a stator of the kind depicted in FIGS. 1 and 2, in combination with a shell/core rotor assembly having the relative displacement features (i.e., angular and axial) described in reference to FIGS. 5A and 6.

As can be seen, the production motor (BL) produced a torque of less than 0.8 Nm (Newton-meter) at standstill, decreasing progressively to zero at about 5000 rpm. In contrast, the motor of the invention, configured with the matched magnets of the shell and core components of the rotor in full mutual registration (i.e., at 0° displacement), produced a torque at standstill of 1.3 Nm. Shifting the shell component to a 9° relationship to the core component, at about 1000 rpm and at a point at which torque had decreased to about 1.05 Nm, enabled operation at about 1800 rpm with a torque of about 0.7 Nm, at which point displacement of the shell component to an 18° relationship to the core component produced a torque value of almost 0.4 Nm at about 3400 rpm. Further changes in the shell/core angular relationship, to 27° and 36°, enabled the motor to continue to operate to speeds in excess of 7000 rpm while maintaining torque output at practical operating values (i.e., something less than 0.2 Nm).

The four discrete curves of FIG. 9 (marked 9°, 18°, 27°, and BL) show that, with changes in the angular relationship between the rotor shell and core components, a high power output, of substantially constant value, was produced by the instant motor throughout a speed range of from about 1000 rpm to more than 7000 rpm. Generally, the power produced by the motor was at least 120 Watts, approaching 150 Watts at 2500 rpm with a core/shell offset of 18°. In contrast, the prior art motor delivered a maximum power output of about 120 Watts (at about 3000 rpm), decreasing to about 90 watts at 4000 rpm; power output from the prior art motor was substantially constant only in the range of about 2000 to 3500 rpm.

Figure 10:
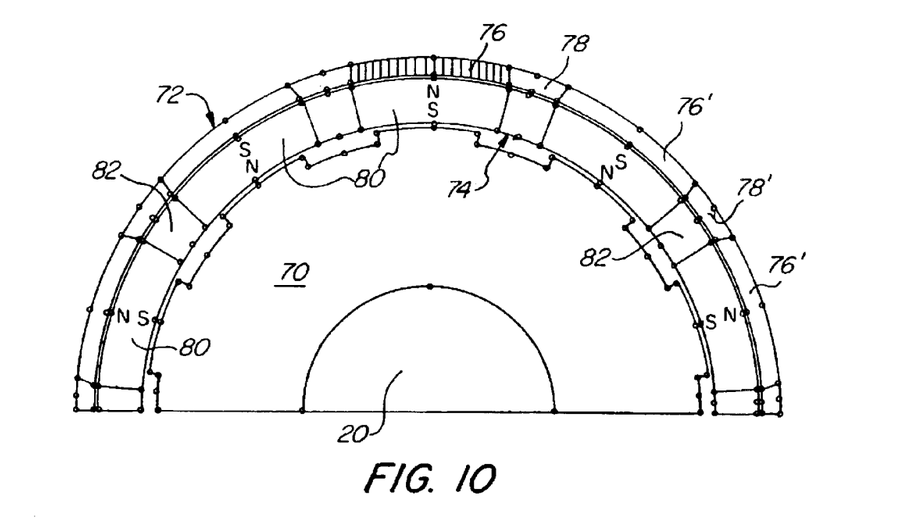
FIG. 10 is a diagrammatic, fragmentary section view, similar to FIGS. 4 and 6, showing a rotor assembly suitable for use in motors embodying the invention and comprising a magnet ring, interposed between the core component and a shell component, fabricated from a magnetic material.
Figure 11:
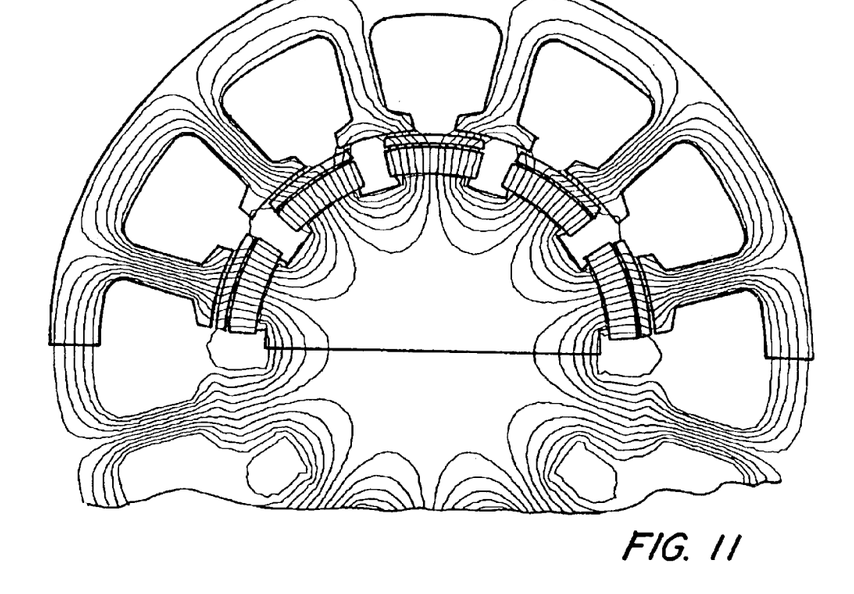
FIGS. 11 and 12 are magnetic flux simulations produced in a motor having the rotor assembly of FIG. 10, with the permanent magnets and magnetic areas in maximally aligned (FIG. 11) and maximally misaligned (FIG. 12) relationships.
Figure 12:
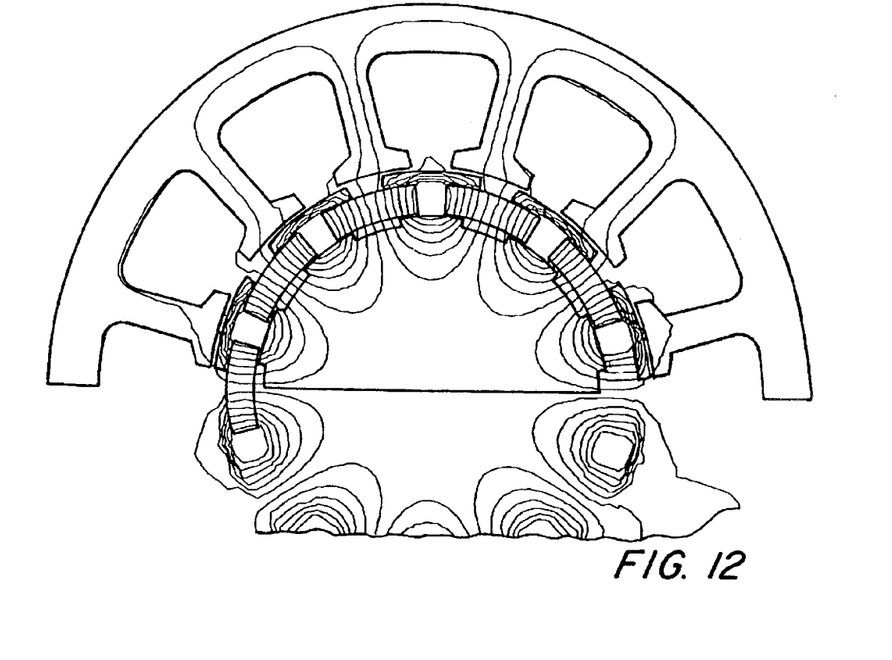

Turning finally to FIGS. 10 through 12 of the drawings, therein illustrated is a rotor assembly, suitable for use in motors embodying the invention, comprised of a core, generally designated by the numeral 70 and rigidly affixed to the shaft 20, and two concentric magnet rings, generally designated by the numerals 72 and 74. The outer ring, or shell, 72 is rigidly affixed to the shaft 20 and consists of a circumferential array of magnetic areas 76 and interposed nonmagnetic areas 78. Each of the magnetic areas 76 may, for example, advantageously be formed as a lateral stack of axially extending steel laminae, or they may constitute areas 76' of high permeability on a magnetic, two-phase material, the material having been heat treated to produce low-permeability, non-magnetic intervening areas 78' thereon (for convenience of illustration, only, both alternatives are shown in this one figure).

The inner ring 74 consists of a circumferential array of mutually spaced permanent magnets 80, disposed in N/S orientations as shown, alternating with non-magnetic areas 82. The ring 74 is rotatable (by means not shown) relative to the core 70 and shell 72 so as to permit angular displacement of the permanent magnets 80 on the ring 74, relative to the magnetic areas 76, continuously through an arc of one-half pitch (i.e., through an angle of 18° mechanical, in the illustrated embodiment), the confronting surfaces of which magnets and areas are substantially coextensive. It will be appreciated that interpositioning of the non-magnetic areas 78 between the permanent magnets 80 and the stator poles of the motor (not shown) greatly reduces the effective magnetic flux density and b-emf, and thereby produces the desired field weakening effect.

This effect is readily observed from a comparison the magnetic finite element simulations comprising FIGS. 11 and 12, the former showing equal potential lines (field lines, flux lines) for the maximum b-emf position (high permeability areas maximally aligned with the permanent magnets), and the latter showing a minimum b-emf position (high permeability areas maximally misaligned); it will be noted that, for clarity of illustration, the outlines for the non-magnetic areas are omitted from these figures.

As will be appreciated by those skilled in the art, the force required for fully inserting and maintaining a conventional permanent magnet rotor into and within the stator is proportional to the change in the total magnet energy value (average magnet load or operating points(s)), and is quite high. Reducing or eliminating the change in the average magnet operating point, over the stroke of relative motion (linear and/or rotational), leads to low, or force-neutral, behavior of the moved member. In the above-described prototype motor, the actuation force needed to rotate and extract the shell component from the stator, while of course maintaining, electronically, the 90° motor torque angle, was found to be minimal.

Although electric servomotors are used in the illustrated embodiments to extract and angularly displace the rotor or rotor components, it will be appreciated that actuation may be accomplished manually or by way of non-electric (e.g., pneumatic and hydraulic) means. The actuation force used to displace the rotor (or a component thereof) may be transmitted by any appropriate means, such a ball-bearing coupling or similar mechanical means, and non-contact actuation force transmittal can be relied upon to further increase reliability and minimize axial motor length. Counteraction of the magnetic forces resisting such movement may be achieved by means other than the helical path-defining and following structures described above, such as, for example, by the use of incorporated mechanical springs or so-called magnetic springs, or by any other functionally equivalent means known in the art.

As discussed above, the low actuation forces that are enabled by the present motor concepts permit the use of linear servomotors for displacement. The ability to dynamically effect the requisite displacement without excessive force, to achieve optimal levels of effective magnetic field strength is, in any event, of great importance in obtaining maximum energy efficiency from the motor; and it contributes fundamentally to the feasibility of external actuation, and hence to the use of the motor for power transmission in practical, full speed range vehicular applications.

Thus it can be seen that the present invention provides a permanent magnet motor that is capable of operating with a high degree of efficiency, and with substantially constant power output, over an extended, wide range of speeds, rendering the motor especially adapted for use as the prime mover in vehicles of various kinds. At standstill and low speeds the motor provides torque levels that are significantly increased over comparable prior art motors; and not only is the range of practical operating speeds extended substantially, but moreover the power generated at higher speeds is also substantially increased, and is substantially constant throughout a large portion of that range. The invention additionally provides a method for the control of operation of the motors described so as to enable extension of the practical speed range capability thereof while, at the same time, affording increased efficiency and power output characteristics.

Having thus described the invention, what is claimed is:

1. In a brushless permanent magnet motor comprised of a stator of magnetic material having a multiplicity of electrically energizable stator pole elements at locations spaced circumferentially about an axis of said motor, and a coaxial rotor rotatable about said axis and having a circumferential array of permanent magnets effectively disposed on an outer surface thereof and in a closely proximate, magnetically interactive, facing relationship to said stator pole elements; the improvement wherein said rotor comprises a cylindrical shell component and a cylindrical inner component disposed concentrically within said shell component with an outer surface of said inner component in magnetically close proximity to an inner surface of said shell component; said shell and inner components being conjointly rotatable and displaceable relative to one another, to selectively establish first and second relative positions, in at least one of the axial direction and a rotational direction; said shell component having an array of first magnetic elements extending circumferentially thereabout, and said inner component having an array of second magnetic elements, comprising permanent magnets, extending circumferentially thereabout for producing magnetic flux at said outer surface thereof; said first and second magnetic elements being dimensioned, configured, and arranged to cooperatively generate relatively strong magnetic fields in said first relative position of said inner and shell components, and thereby to produce maximal values of flux density in the magnetic interaction between said stator pole elements and said permanent magnets, and to generate magnetic fields that are weak, relative to said relatively strong magnetic fields, in said second relative position of said inner and shell components and thereby to produce values of flux density in such magnetic interaction that are reduced substantially from said maximal values of flux density.

2. The motor of claim 1 wherein said first magnetic elements are permanent magnets.

3. The motor of claim 1 wherein said first magnetic elements are elements of relatively high permeability, said shell component having areas of relatively low permeability interposed between circumferentially adjacent said first magnetic elements.

4. The motor of claim 1 additionally including means for effecting such relative displacement between said first and second positions.

5. The motor of claim 4 wherein said means for effecting displacement is operative independently of rotation of said rotor.

6. The motor of claim 5 wherein said means for effecting relative displacement comprises a servomotor.

7. The motor of claim 1 wherein the polarities of said permanent magnets alternate in said array.

8. The motor of claim 2 wherein the polarities of said permanent magnets alternate in both of said arrays.

9. The motor of claim 1 wherein at least said first magnetic elements of said shell components alternate in said array with non-magnetic area.

10. The motor of claim 1 wherein said inner component is a core of said rotor.

11. The motor of claim 1 wherein said motor additionally has a core component and said inner component comprises a ring member interposed between said core and shell components.

12. In a brushless permanent magnet motor comprised of a stator of magnetic material having a multiplicity of electrically energizable stator pole elements at locations spaced circumferentially about an axis of said motor, and a coaxial rotor rotatable about said axis and having a circumferential array of permanent magnets effectively disposed on an outer surface thereof and in a closely proximate, magnetically interactive, facing relationship to said stator pole elements; the improvement wherein said rotor comprises a cylindrical shell component and a cylindrical inner component disposed concentrically within said shell component with an outer surface of said inner component in magnetically close proximity to an inner surface of said shell component; said shell and inner components being conjointly rotatable and displaceable relative to one another, to selectively establish first and second relative positions; said shell component having an array of first magnetic elements extending circumferentially thereabout, and said inner component having an array of second magnetic elements, comprising permanent magnets, extending circumferentially thereabout for producing magnetic flux at said outer surface thereof; said first and second magnetic elements being dimensioned, configured, and arranged to cooperatively generate relatively strong magnetic fields in said first relative position of said inner and shell components, and thereby to produce maximal values of flux density in the magnetic interaction between said stator pole elements and said permanent magnets, and to generate magnetic fields that are weak, relative to said relatively strong magnetic fields, in said second relative position of said inner and shell components and thereby to produce values of flux density in such magnetic interaction that are reduced substantially from said maximal values of flux density, said shell and inner components being relatively displaceable in both said axial and also said rotational directions.

13. The motor of claim 12 additionally including means for constraining such relative displacement between said first and second positions.

14. The motor of claim 13 wherein said means for constraining displacement comprises a guide member having structure defining a path with a portion that extends generally helically, relative to said axis, and a follower member for cooperating with said guide member and including a follower element for movement along said path-defining structure, said guide member being operatively connected to one of said rotor components and said follower member being operatively connected to the other of said rotor components.

15. The motor of claim 14 wherein said path defined by said guide member structure includes a generally rectilinear axial portion leading to said helical portion.

16. The motor of claim 15 wherein said first relative position of said shell and inner components is produced with said follower element adjacent the terminus of said helical path portion remote from said rectilinear portion.

17. In a brushless permanent magnet motor comprised of a stator of magnetic material having a multiplicity of electrically energizable stator pole elements at locations spaced circumferentially about an axis of said motor, and a coaxial rotor rotatable about said axis and having a circumferential array of permanent magnets effectively disposed on an outer surface thereof and in a closely proximate, magnetically interactive, facing relationship to said stator pole elements; the improvement wherein said rotor comprises a cylindrical shell component and a cylindrical inner component disposed concentrically within said shell component with an outer surface of said inner component in magnetically close proximity to an inner surface of said shell component; said shell and inner components being conjointly rotatable and displaceable relative to one another, to selectively establish first and second relative positions, in at least one of the axial direction and a rotational direction; said shell component having an array of first magnetic elements extending circumferentially thereabout, and said inner component having an array of second magnetic elements, comprising permanent magnets, extending circumferentially thereabout for producing magnetic flux at said outer surface thereof; said first and second magnetic elements being dimensioned, configured, and arranged to cooperatively generate relatively strong magnetic fields in said first relative position of said inner and shell components, and thereby to produce maximal values of flux density in the magnetic interaction between said stator pole elements and said permanent magnets, and to generate magnetic fields that are weak, relative to said relatively strong magnetic fields, in said second relative position of said inner and shell components and thereby to produce values of flux density in such magnetic interaction that are reduced substantially from said maximal values of flux density; and said motor additionally including means for effecting such relative displacement of said shell and inner components.

18. The motor of claim 17 wherein said means for effecting such relative displacement comprises a servomotor.

19. The motor of claim 18 wherein said means for constraining displacement comprises a guide member having structure defining a path, and a follower member for cooperating with said guide member and including a follower element for movement along said path-defining structure, said guide member being operatively connected to one of said rotor components and said follower member being operatively connected to the other of said rotor components.

20. The motor of claim 17 additionally including means for constraining such relative displacement between said first and second positions.

21. In a method for controlling the operation of a brushless permanent magnet motor, said motor being comprised of a stator of magnetic material having a multiplicity of electrically energizable stator pole elements at locations spaced circumferentially about an axis of said motor, and a coaxial rotor rotable about said axis and having a circumferential array of permanent magnet bodies disposed in a closely proximate, magnetically interactive, facing relationship to said stator pole elements; said rotor being comprised of a cylindrical shell component and a cylindrical inner component disposed concentrically within said shell component with an outer surface of said inner component in magnetically close proximity to an inner surface of said shell component; said shell and inner components being conjointly rotatable and displaceable relative to one another, to selectively establish first and second relative positions, in at least one of the axial direction and a rotational direction; said shell component having an array of first magnetic elements extending circumferentially thereabout, and said inner component having an array of second magnetic elements, comprising permanent magnets, extending circumferentially thereabout for producing magnetic flux at said outer surface thereof; said first and second magnetic elements being dimensioned, configured, and arranged to cooperatively generate relatively strong magnetic fields in said first relative position of said inner and shell components, and thereby to produce maximal values of flux density in the magnetic interaction between said stator pole elements and said permanent magnets, and to generate magnetic fields that are weak, relative to said relatively strong magnetic fields, in said second relative position of said inner and shell components and thereby to produce values of flux density in such magnetic interaction that are reduced substantially from said maximal values of flux density; the steps comprising operating said motor from standstill with said rotor components substantially in said first relative position, and displacing said rotor components relative to one another toward said second relative position with increasing speed of said rotor.

22. The method of claim 21 wherein the extent of said rotor component relative displacement corresponds to said increasing speed.

* * * * *